(No Model.) 10 Sheets—Sheet 1.

T. A. BRIGGS.
PAPER FEEDING MACHINE.

No. 480,447. Patented Aug. 9, 1892.

Fig. 1

WITNESSES:
Mark W. Dewey
C. L. Bendixon

INVENTOR
Thomas A Briggs
By Duell, Laass & Duell
his ATTORNEYS.

(No Model.)  10 Sheets—Sheet 2.

T. A. BRIGGS.
PAPER FEEDING MACHINE.

No. 480,447. Patented Aug. 9, 1892.

WITNESSES:
Mark W. Dewey
C. L. Bendixon

INVENTOR
Thomas A. Briggs
By Duell, Lesser & Duell
his ATTORNEYS.

(No Model.) 10 Sheets—Sheet 3.

T. A. BRIGGS.
PAPER FEEDING MACHINE.

No. 480,447. Patented Aug. 9, 1892.

Fig. 3

WITNESSES:
Mark W. Dewey
C. L. Bendixon

INVENTOR:
Thomas A. Briggs
By Dudley, Laass & Hull
his ATTORNEYS.

(No Model.)  10 Sheets—Sheet 4.

T. A. BRIGGS.
PAPER FEEDING MACHINE.

No. 480,447.  Patented Aug. 9, 1892.

WITNESSES:
Mark W. Dewey
C. L. Bendixon

INVENTOR:
Thomas A. Briggs
By Hull, Laass + Hull
his ATTORNEYS.

THE NORRIS PETERS CO., PHOTO-LITHO., WASHINGTON, D. C.

(No Model.) 10 Sheets—Sheet 6.
T. A. BRIGGS.
PAPER FEEDING MACHINE.

No. 480,447. Patented Aug. 9, 1892.

WITNESSES:
Mark W. Dewey
C. L. Bendixon

INVENTOR
Thomas A. Briggs
By Duell, Lassrodull
his ATTORNEYS.

(No Model.) 10 Sheets—Sheet 7.

T. A. BRIGGS.
PAPER FEEDING MACHINE.

No. 480,447. Patented Aug. 9, 1892.

WITNESSES:
Mark W. Dewey
C. L. Bendixon

INVENTOR:
Thomas A. Briggs
By Dudly Laass & Dudl
his ATTORNEYS.

(No Model.) 10 Sheets—Sheet 8.

T. A. BRIGGS.
PAPER FEEDING MACHINE.

No. 480,447. Patented Aug. 9, 1892.

WITNESSES:
Mark W. Dewey
C. L. Bendixon

INVENTOR:
Thomas A. Briggs
By Dull, Laass + Dull
his ATTORNEYS.

(No Model.) 10 Sheets—Sheet 9.

T. A. BRIGGS.
PAPER FEEDING MACHINE.

No. 480,447. Patented Aug. 9, 1892.

WITNESSES:
Mark W. Dewey
C. L. Bendixon

INVENTOR:
Thomas A. Briggs
By Dudly, Leass & Dudl
his ATTORNEYS.

(No Model.)

T. A. BRIGGS.
PAPER FEEDING MACHINE.

No. 480,447. Patented Aug. 9, 1892.

WITNESSES:
Mark W. Dewey
C. L. Bundixon

INVENTOR:
Thomas A. Briggs
By Dudley Lassot Dutt
his ATTORNEYS.

UNITED STATES PATENT OFFICE.

THOMAS A. BRIGGS, OF ARLINGTON, MASSACHUSETTS.

PAPER-FEEDING MACHINE.

SPECIFICATION forming part of Letters Patent No. 480,447, dated August 9, 1892.

Application filed November 24, 1891. Serial No. 412,989. (No model.)

*To all whom it may concern:*

Be it known that I, THOMAS A. BRIGGS, of Arlington, in the county of Middlesex, in the State of Massachusetts, have invented new and useful Improvements in Paper-Feeding Machines, of which the following, taken in connection with the accompanying drawings, is a full, clear, and exact description.

This invention relates to the class of paper-feeding machines which pass the sheets of paper automatically from a pile to the printing-machine; and it consists in an improved organization of a paper-feeding machine composed of novel mechanisms, which render said machine most efficient, expeditious, and reliable in its operation, all as hereinafter fully described, and set forth in the claims.

The invention is fully illustrated in the annexed drawings, in which—

Similar letters and figures of reference indicate corresponding parts.

Figure 1:
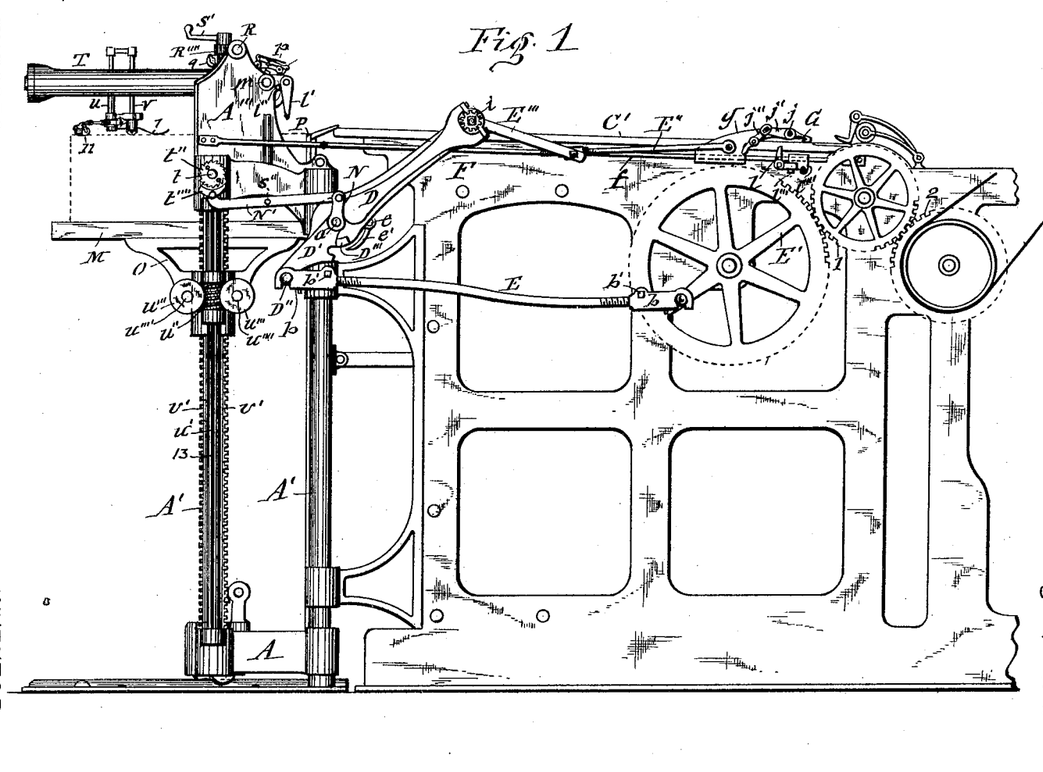
Figure 1 is a side elevation of a paper-feeding machine embodying my invention.
Figure 3:
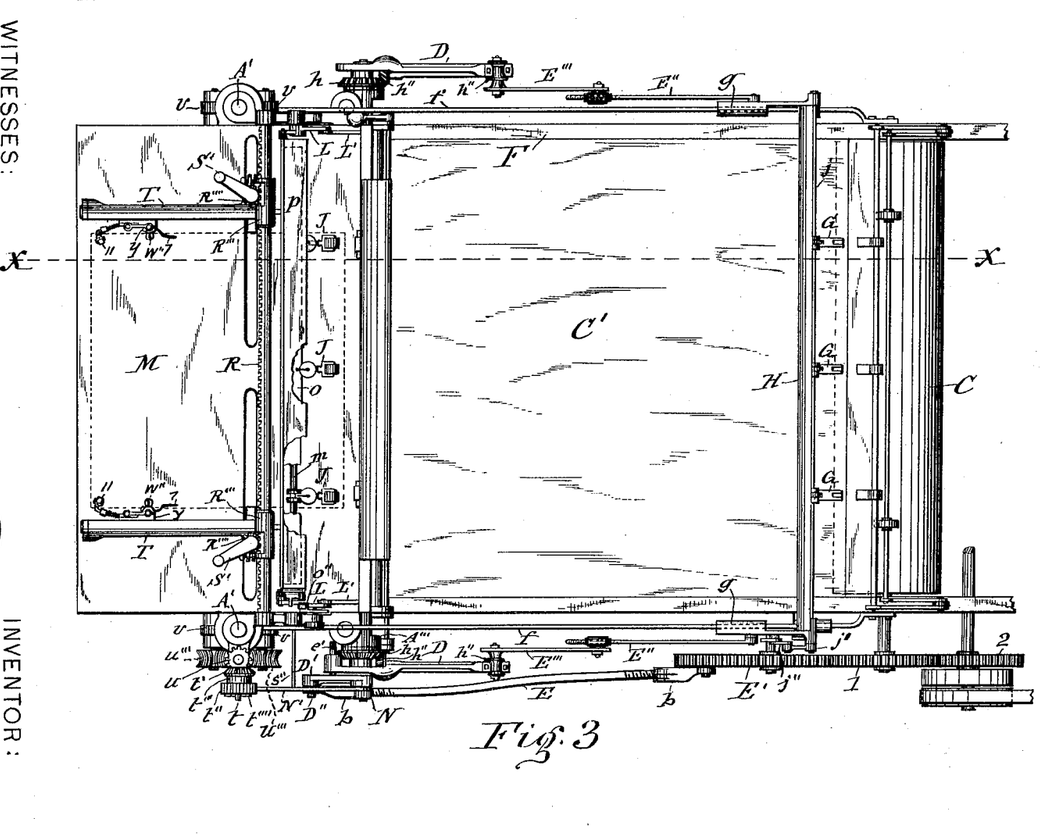
Fig. 3 is a plan view.
Figure 4:
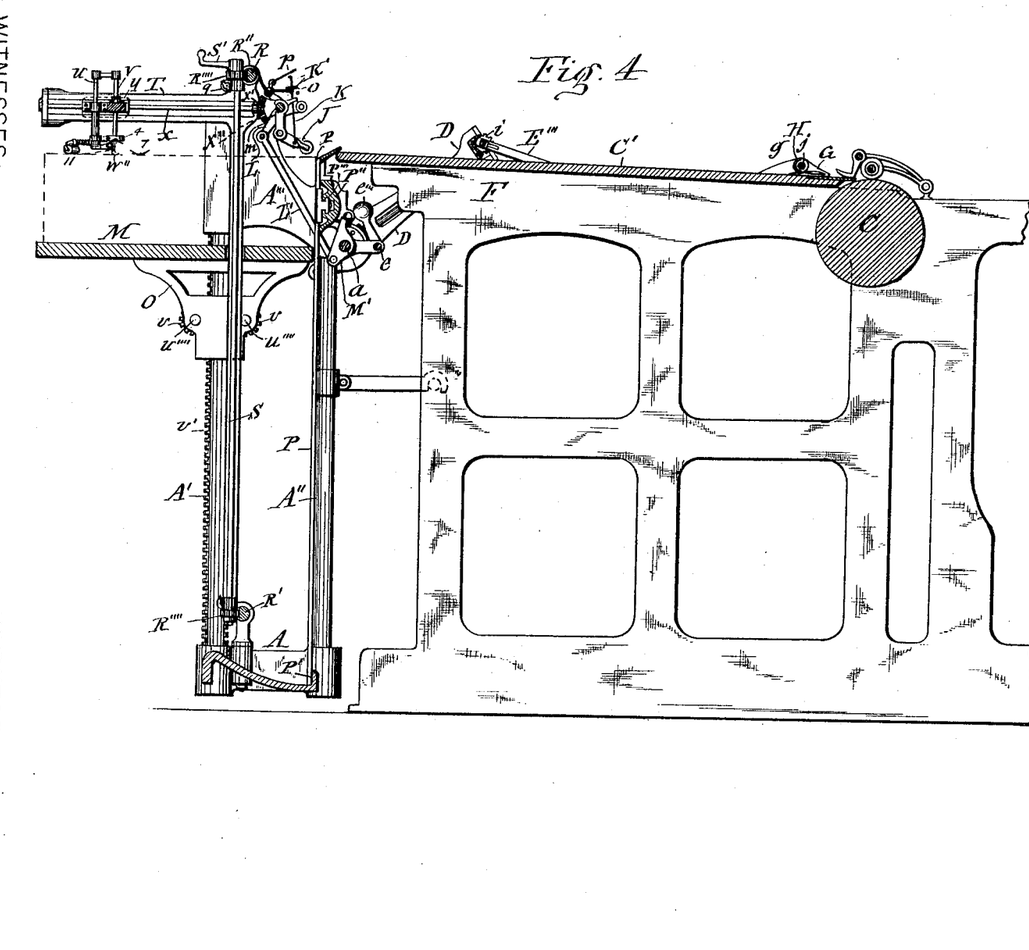
Fig. 4 is a vertical longitudinal section on line $x\ x$ in Fig. 3.

F represents the rear end portion of the frame of a cylinder printing-machine, of which only the impression-cylinder C and feed-table C' are shown in Figs. 1, 3, and 4 of the drawings.

To the rear end of said machine I attach the frame of my improved automatic paper-feeding machine, which latter frame embraces certain features of novelty which constitute the subject-matter of another application for Letters Patent, Serial No. 412,990, filed November 27, 1891, prepared by me. Said frame consists, mainly, of a base-plate A, two pairs of posts A' A'', rising from said base at opposite sides of the machine, two heads A''', attached to the upper ends of said posts, and a cross-bar P'', extending across the machine and secured to the aforesaid heads at the edges adjacent to the frame F.

Across the machine extends a horizontal shaft $a$, which is journaled in suitable bearings on the aforesaid edges of the heads A''', and to each end of said shaft is rigidly secured an arm D, which I designate a "rock-arm," inasmuch as it receives an oscillatory motion in the following manner.

To one end of the shaft $a$, adjacent to the rock-arm D, is pivoted a supplemental arm D', the free end of which has affixed to it a wrist-pin D'', to which latter is connected the pitman E, which extends along the side of the frame F and is connected to a crank or wrist-pin on a wheel E', which receives rotary motion from the driving-shaft of the printing-machine by means of suitable gearings, which may be arranged in any suitable manner. For a mere exemplification of said gearing I have represented the same in the form of the gear-wheels 1 2 in Figs. 1 and 3 of the drawings.

Figure 21:
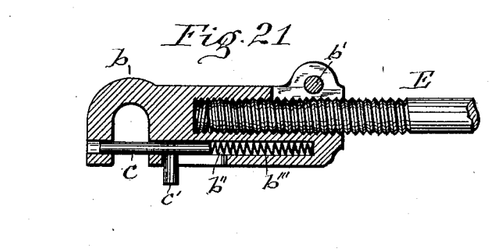
Figs. 21 and 22 are respectively a longitudinal section and an inverted plan view of one of the connecting-hooks of the pitman.
Figure 22:
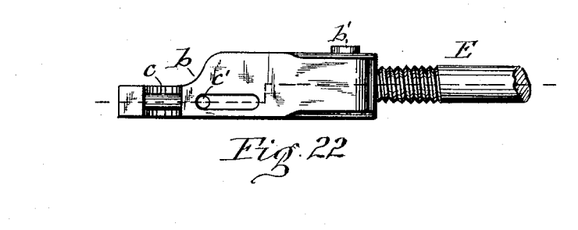

Inasmuch as the driving-gears of the printing-machine vary somewhat in their location, I make the pitman E adjustable in length and also in alignment, so that my automatic paper-feeding machine can be accommodated to such variations. I bend the said pitman so as to bring the two end portions thereof out of line but parallel with each other, and screw-thread said end portions in one and the same direction and screw thereon the connecting hooks or couplings $b$ $b$, which are provided with screw-threaded sockets for the reception of said ends of the pitman. The screw-threads of the two ends of the pitman running in the same direction allows the pitman to be turned without changing the distance between the two connecting-hooks $b$ $b$, and by turning the pitman the lineal position of said hooks in relation to each other is changed to accommodate them to the position of the wrist-pins to which they are to be connected. In order to allow the said pitman to be retained in its adjusted position, I split the connecting-hooks $b$ $b$ longitudinally at the ends by which they are connected to the pitman and provide the divided portion of each of said hooks with coinciding transverse bolt-holes, one of which is screw-threaded, and a bolt $b'$, passing through said holes, clamps the split portions of the connecting-hook $b$ on the pitman E, as best seen in Figs. 21 and 22 of the drawings.

Figures 6, 7:
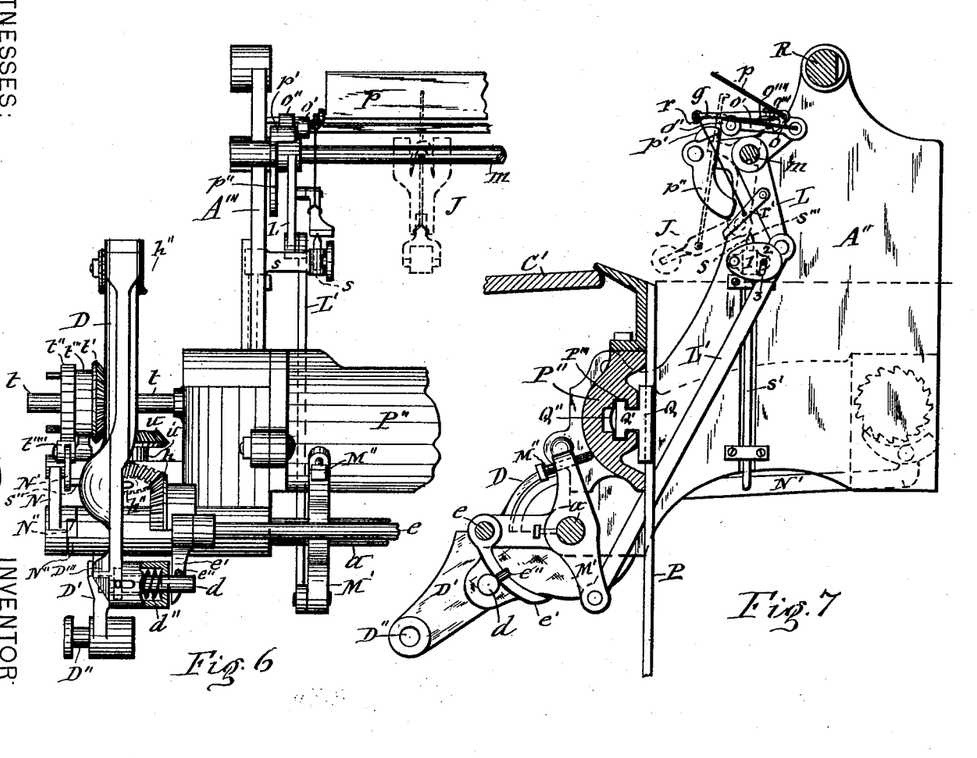
Fig. 6 is an end view of one side of said portion of the machine.
Fig. 7 is a view of the inner side of frame and with the mechanisms connected thereto.

To facilitate the operation of connecting and disconnecting the pitman to and from the wrist-pins, I provide the connecting-hook $b$ with a longitudinal channel $b''$, extending from the hook end nearly to the opposite end, and in said channel I insert a spiral spring $b'''$ and a slide-bolt $c$, which latter is thus backed by said spring and is forced outward by the same. A thumb-piece $c'$ passes through a longitudinal slot in the under side of the connecting-hook and is screwed into a socket in the under side of the bolt $c$, said slot permitting sufficient longitudinal movement of the bolt to allow the same to enter with its outer end into a socket or an eye in the hook portion of the connecting-hook $b$, and also allow the bolt to be retracted, so as to clear the entrance in the connecting-hook, and thus allow the same to be hooked onto the wrist-pin. The spring $b'''$ automatically forces the bolt $c$ out and across the wrist-pin, and thus retains thereon the connecting-hook $b$. The two connecting-hooks $b$ $b$ on opposite ends of the pitman can be readily adjusted to the proper distance apart to correspond to the distance between the wrist-pins by turning one or both of the connecting-hooks, in which operation the screw connection of the latter with the pitman causes the connecting-hook to move longitudinally on the pitman. The supplemental arm D' is locked on the rock-arm D by means of a bolt $d$, passing transversely and loosely through the rock-arm and entering a socket $d'$ in the inner or adjacent side of the supplemental arm, into which socket it is forced by a spring $d''$, as shown in Figs. 3 and 6 of the drawings. On the rock-arm D is a boss D''', against which the supplemental arm rests when in position to be locked by the bolt $d$. Said boss relieves the bolt from strain sufficiently to allow the same to be readily withdrawn from the supplemental arm when desired to release the rock-arm from its locked connection with the supplemental arm, and thereby arrest the motion of the rock-arm. To effect this automatically, I extend across the frame A a rod $e$ and mount it revolubly in suitable bearings on the frame, and to one end of said rod I rigidly attach a cam $e'$, which by turning said rod can be thrown across the inner protruding end of the bolt $d$, where it engages the outer side of a lug or pin $e''$, projecting from the side of the bolt, as shown in Figs. 6 and 7 of the drawings. Said cam is beveled so as to press on the pin $e''$ with gradually-increasing force during the rocking motion of the arm D, and thereby withdraw the bolt from said arm. To retain the cam either in or out of the aforesaid position, as may be desired, I rigidly attach to the opposite end of the rod $e$ a weighted crank $e'''$. By turning said crank so as to cause it to rest in an inclined position against the frame A the cam $e'$ is set into the path of the pin $e''$ of the bolt $d$, and when the weighted crank is turned into a pendent position the cam is out of the path of the aforesaid pin. The crank is retained in its aforesaid two positions automatically by its gravity.

To opposite sides of the frame are attached longitudinal guide-rods $f$, on which are mounted the slides $g$ $g$, which are connected to the free ends of the rock-arms D D by pitmen E'' E''.

Figure 26:
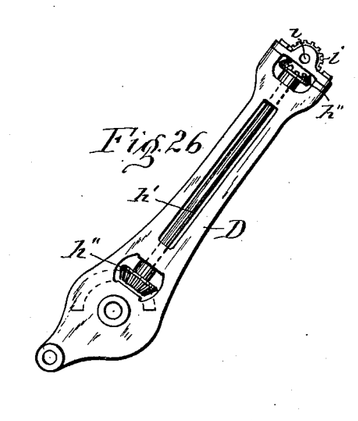
Fig. 26 is an inner face view of the rock-arm and mechanism connected thereto.

In order to increase the length of the movement of the slides $g$ $g$ over the stroke of the rock-arms, I employ, in connection with the rock-arms, the following mechanism for transmitting motion to the pitmen: To each side of the frame I firmly attach a segmental beveled gear $h$, concentric to the rock-shaft $a$, and on the rock-arm D, I journal a shaft $h'$, extending lengthwise of the rock-arm and having secured to opposite ends beveled pinions $h''$ $h''$, one of which engages the segmental gear $h$, as shown in Fig. 6 of the drawings and represented in dotted lines in Fig 26 of the drawings. The pinion on the opposite end or outer end of the shaft $h'$ meshes with a similar pinion $i$, fixed to a short shaft $i'$, journaled transversely to the free end of the rock-arm. To this shaft $i'$ is firmly secured an arm E''', the opposite end of which is pivotally connected to the pitman E''.

The details of the rock-arm D and mechanisms connected thereto I have more fully described in another application for Letters Patent of even date herewith, and in which it constitutes the subject-matter claimed therein.

In the oscillations of the two rock-arms D the shaft $h'$ is rotated alternately in opposite directions by the engagement of the inner pinion $h''$ with the stationary segmental gear $h$, and a corresponding motion is transmitted to the transverse shaft $i'$ by the engagement of its pinion $i$ with the pinion $h''$ on the outer end of the shaft $h'$, and by the motion of said transverse shaft an oscillatory movement is imparted to the arm $E'''$ of greater speed and stroke than that of the rock-arm, and consequently the length of the stroke of the pitman is likewise increased to carry the slide $g$ the entire length of the feed-table $C'$ of the printing-machine. Transversely over the said feed-table is a shaft $j$, journaled to the slides $g\ g$, and to said shaft are fastened the grippers, the construction and attachment of which is shown in detail in Figs. 10 and 11 of the drawings, in which G represents a hook formed with perforated ears $G'\ G'$ on its rear end, by which it is hung on the shaft $j$, and from said ears project shoulders $G''\ G''$, which abut against the edges of a concave bar H, disposed parallel with the shaft $j$ and rigidly attached to the slides $g\ g$. The hooks G G are thus sustained rigidly in their position.

On the under side of the body of the hook G is a tongue $H'$, formed at its rear end with an eye $H''$, by which it is hung on the shaft $j$ between the ears $G'\ G'$. Radially through the said eye passes a set-screw $H'''$, which engages the shaft, and thereby fastens thereto the tongue H.

Figure 5:
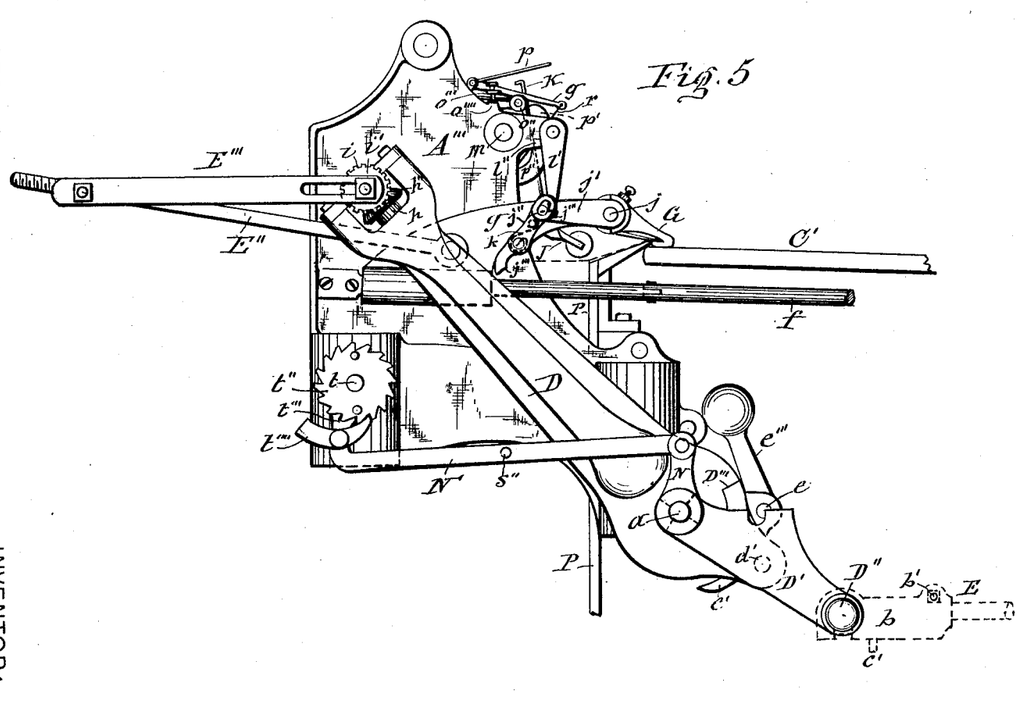
Fig. 5 is an enlarged side view of the upper and main portion of the paper-feeding machine.
Figures 10, 11:
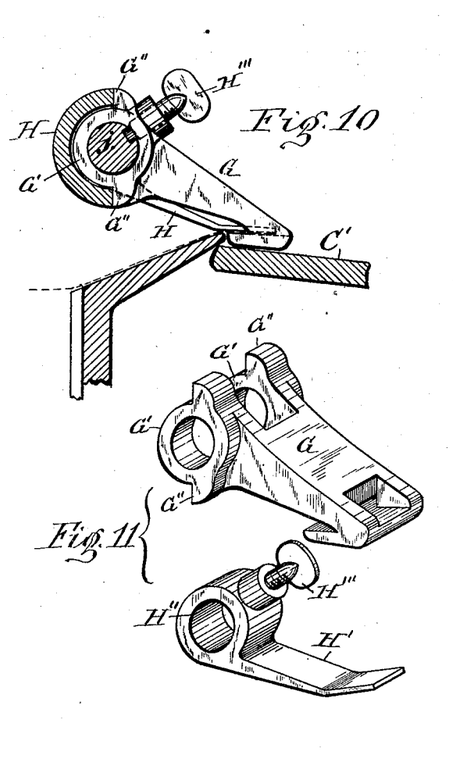
Fig. 10 is a side view of the gripper, which draws the paper over the feed-table of the printing-machine.
Fig. 11 is a detached perspective view of the component parts of said gripper.

To one end of the shaft $j$ is fastened a crank $j'$, and to the side of the slide $g$ is pivoted a finger $j''$, one end of which is provided with a longitudinal slot, by which it is pivotally connected to a trunnion on the free end of the crank $j'$, as shown in Fig. 5 of the drawings. A suitable spring $k$ holds the finger in an inclined position and causes it to press upward the free end of the crank $j'$ and turn the shaft $j$ so as to hold the grippers G G with their free ends in proximity to the feed-table $C'$, as shown in Fig. 10 of the drawings. The finger $j''$ is formed with a downwardly and upwardly extending cams $j'''$, which downward cam comes in contact with a stop $l$ as the grippers G G arrive at the end of their forward movement, and by this contact the finger $j''$ is caused to depress the rear end of the crank $J'$, and thereby turn the shaft $j$ so as to lift the free ends of the tongues H H of the grippers G G, and thus open the grippers and liberate the paper drawn forward by the grippers to deliver the paper to the usual and well-known grippers on the impression-cylinder C of the printing-machine. The stop $l$ is of the form of an L-shaped latch pivoted at its angle to a block $l''''$, mounted on the guide-rod $f$. The horizontal limb of the stop is weighted and normally rests on a shoulder $l'''$, projecting from the block $l''''$, as shown in Fig. 1 of the drawings. The stop is allowed to tilt rearward and leave the tripping-finger $j''$ undisturbed while the same is drawn back on the stop.

Back of the rear end of the feed-table $C'$ is another tripper $l'$, hung on the frame-head $A'''$, which tripper is allowed to swing forward, but restrained from swinging rearward by a suitable stop $l''$ on the frame, as best seen in Fig. 5 of the drawings, which shows said tripper in its operation. As the slides $g$ are drawn to the rear end of the feed-table $C'$ the finger $j''$, with its upward cam $j'''$, passes under and to the rear of the tripper $l'$, and is thereby depressed and immediately released to allow the grippers G to take hold of the front edge of the paper passed to the grippers by the pushers hereinafter described. As the slides $g$ move forward the tripper $l'$, being free to swing in said direction, leaves the grippers in their closed condition to draw the paper forward over the feed-table C.

Figures 8, 9:
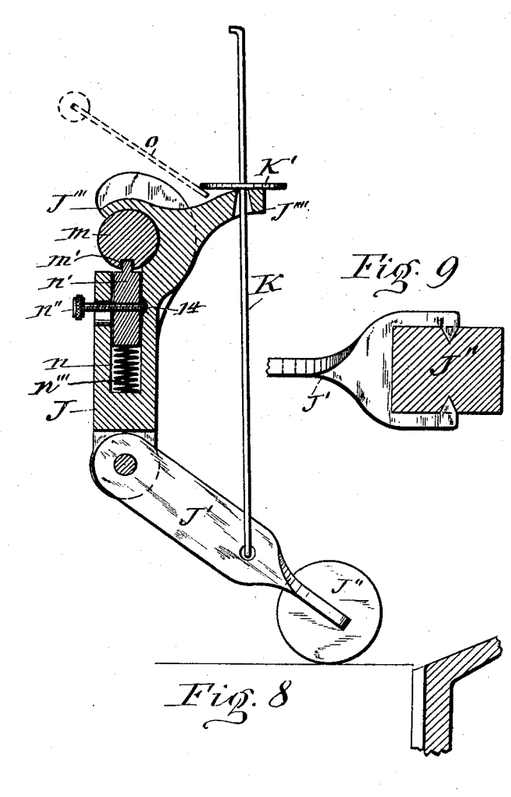
Fig. 8 is partly a side view and partly a sectional view of the pusher, which passes the paper from the pile to the feed-table of the printing-machine.
Fig. 9 is a detail view of the attachment of the rubber block to the pusher.

Above the plane of the feed-table $C'$ and back of the rear end thereof is a transverse shaft $m$, pivoted at its ends to the heads $A'''$ of the supporting-frame of my automatic paper-feeding machine. On said shaft are hung the paper-feeding pushers, consisting of arms J, firmly secured thereto in a pendent position, and fingers $J'$, hinged to said arms, so as to be sustained with their lower end inclined toward the rear end of the feed-table $C'$, to the free ends of which fingers are fastened the rubber or other suitable friction-blocks $J''$, as best seen in Figs. 8 and 9 of the drawings. The said friction-blocks I prefer to form cylindrical, but I fit them tightly in the bifurcated end of the finger $J'$, which is provided with angular spurs entering opposite sides of the block $J''$, as clearly shown in Fig. 9 of the drawings. The block is thus prevented from accidentally turning, and yet allows it to be turned by hand when desired to bring a new surface thereof in contact with the paper.

To facilitate the attachment and detachment of the arm J to and from the shaft $m$, and also allow said arm to be shifted longitudinally on said shaft to accommodate the paper-pusher to the width of the paper to be fed to the printing-machine, I provide the said shaft with a longitudinal groove $m'$ and form the upper end of the arm J with a hook $J'''$, by which it is hung on the shaft, as shown in Fig. 8 of the drawings. The pendent portion of the arm J is provided with a longitudinal channel $n$, in which is a sliding bolt $n'$, which has a screw-threaded hole transversely through it, and in said hole is inserted a thumb-screw $n''$, which projects through a longitudinal slot in the side of the arm. The interior of the channel $n$ is formed with a recess 14, in such a position that when the bolt $n'$ has entered the groove $m'$ of the shaft $m$ the thumb-screw can be turned so as to cause its inner end to enter the recess 14, and thus securely lock the bolt. In the bottom of the longitudinal channel $n$ is a spiral spring $n'''$, which forces the bolt upward and in engagement with the groove $m'$. The upper end of the arm J is formed with a forward projection $J''''$, which has a vertical perforation, through which passes freely a rod K, attached to the finger $J'$. On said rod is a disk $K'$, which has a perforation of such a size as to allow the rod to slide freely through it when the disk rests horizontally on the projection $J''''$, as illustrated in Fig. 8 of the drawings, but by tilting the said disk it becomes bound on the rod. To each end portion of the shaft $m$ is fastened a bell-crank L, one end of which is connected by a pitman $L'$ to the lower end of a lever $M'$, fixed to the rock-shaft $a$, to which the rock-arm D is attached, and thus an oscillatory motion is transmitted to the bell-crank L and shaft $m$. To the upper end of the lever $M'$ is adjustably connected a set-screw $M''$, which by contact with the frame, as shown in Fig. 7 of the drawings, serves as a stop by which to adjust the said lever to its requisite position on the rock-shaft.

$o$ represents a metallic plate, which extends across the machine and projects from the front side of a shaft pivoted to the upper ends of the two bell-cranks L on opposite sides of the machine. To one end of said shaft is secured a forwardly-extending arm $o'$, to the free end of which is pivoted a roller $o''$, for the purpose hereinafter explained. From the side of said arm projects a lug $o'''$, of sufficient length to strike the top of the frame $A'''$ when the free end of the arm is deprived of its support, as hereinafter described.

$p'$ is a cam pivoted to the frame-head $A'''$ and formed with a pendent arm $p''$, by the gravity of which the said cam is sustained in its normal position, and when in said position the roller $o''$ of the arm $o'$ rides upon the cam $p'$. The oscillation of the bell-crank L rocks the shaft $m$, which causes the arms J J of the paper-pushers to oscillate back and forth over the paper piled on the supporting-table M, said paper abutting with the front edges of the sheets against vertical plates P P, hereinafter more fully described. Simultaneously with the oscillations of the aforesaid paper-pushers the plate $o$ is moved back and forth and pushed under the disks $K'$ by the upper arms of the bell-cranks L, said plate moving rearward as the paper-pushers move forward. In the forward movement of the plate the roller $o''$ rides upon the top of the cam $p'$ until it drops from the front end of the cam. This dropping is arrested by the lug $o'''$ on the arm $o'$ striking the top of the frame $A'''$, from which projects an inclined cam $o''''$. (Shown in Fig. 5, and indicated by dotted lines in Fig. 7.) In the rearward movement of the plate $o$ the roller $o''$ passes under the cam and to the rear end thereof, and in this latter movement the lug $o'''$ is drawn upon the inclined cam $o''''$, which lifts the arm $o'$ and causes the roller $o''$ to pry up the rear end of the cam until the roller has passed said end, when the cam is thrown back to its normal position by gravity of the pendent arm $p''$ of said cam. The plate then, moving forward again, causes the roller to travel on top of the cam, and thereby further lift the front edge of the plate $o$, which is under the rear portions of the disks $K'\ K'$. Said disks are thus lifted and at the same time tilted so as to become bound on and lift with it the rods K, which are attached to the paper-pushing fingers $J'$. Said fingers are thereby lifted off from the paper during the rearward movement of the fingers. To the rear portion of the plate $o$ and axially parallel therewith is pivoted a shaft, to which is attached a plate $p$, the front portion of which extends over one or more of the rods K, and to said shaft is also firmly secured a lever $g$, which reaches over the front edge of the plate $o$ and is connected by a rod $r$ to a lever $r'$, pivoted to the lower arm of the bell-crank L, as shown in Fig. 7 of the drawings. Said plate $p$ I designate the "regulating-plate," inasmuch as it regulates the action of the mechanisms which automatically raise the paper-supporting table M, as hereinafter described.

Figure 12:
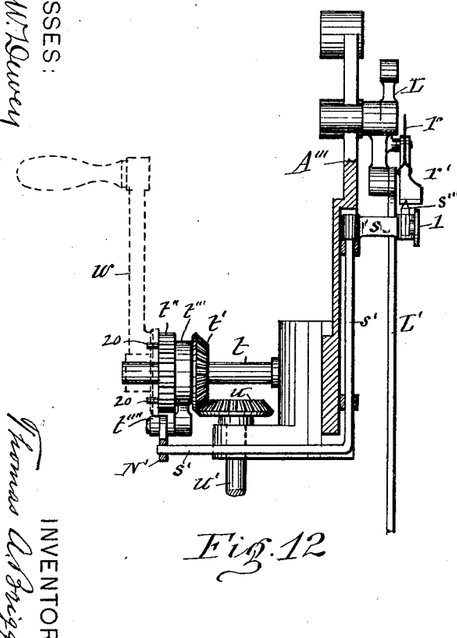
Fig. 12 is a detail view of the devices for turning the shaft, which raises and lowers the paper-supporting table.
Figure 23:
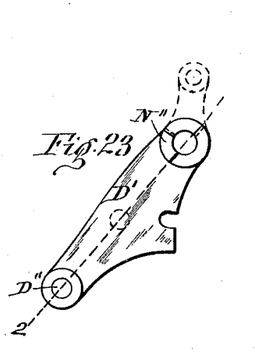
Fig. 23 is a detached view of the outer side of the supplemental rock-arm.
Figure 24:
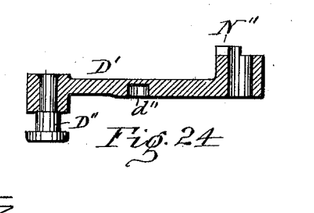
Fig. 24 is a longitudinal section on line 2 2 in Fig. 23.
Figure 25:
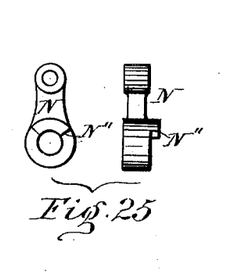
Fig. 25 shows side and edge views of the arm which transmits motion from the supplemental arm to the mechanisms which raise the feed-table.

In the path of the free end of the lever $r'$ is a crank $s$, which projects horizontally from the upper end of a vertical shaft $s'$, journaled in bearings secured to the frame-head $A'''$, as best seen in Fig. 12 of the drawings, and from the lower end of said vertical shaft extends outward another crank-arm $s''$. From the side of the frame-head $A'''$ projects horizontally a stud-pin $t$, on which is loosely mounted a bevel-pinion $t'$, which has rigidly attached to it or integral with it a ratchet-wheel $t''$ and a hub between them, on which hub is loosely mounted a hanger $t'''$, to the lower end of which is connected the pawl $t''''$, adapted to engage the aforesaid ratchet-wheel. On the rock-shaft $a$, adjacent to the supplemental rock-arm $D'$, is loosely mounted a crank N, the free end of which is connected to the lower end of the hanger $t'''$ by a rod $N'$, and to this rod is connected the lower crank-arm $s''$. The adjacent faces of the hubs of the supplemental rock-arm $D'$ and crank N are formed with projections $N''$, which extend about one-fourth the distance around the eyes by which said arm and crank are hung on the rock-shaft. Said projections are shown in detail in Figs. 23, 24, and 25 of the drawings. The projection on the crank N is diametrically opposite that on the rock-arm $D'$, and inasmuch as said projections extend only about one-fourth the way around the eyes of the said members there is sufficient space between the adjacent ends of the two projections to allow the rock-arm $D'$ to operate to a certain degree without transmitting motion to the crank N. By swinging the crank N rearward into such angle in relation to the rock-arm D' as to cause the rear end of the projection $n''$ to come in contact with the rear end of the projection on the rock-arm during the forward oscillation of the latter, as represented in Fig. 5 of the drawings, the crank N partakes motion from said rock-arm and is swung forward with the same, and in this movement said crank draws the pawl $t''''$ forward by the rod N'. Said pawl, being in engagement with the ratchet-wheel $t''$, imparts a partial rotation to the pinion $t'$.

The crank N is set into its aforesaid operative position by the regulating-plate $p$ in the following manner: In the operation of passing the sheets of paper successively from the pile on the supporting-table M to the feed-table C' by the oscillatory push-fingers J' the latter obviously drops after the passage of each sheet a distance equal to the thickness of the sheet last past. The regulating-plate $p$, riding on the rod K, which is attached to the finger J', causes said plate to turn downward to a corresponding degree, and after a number of sheets have been passed from the pile the position of the finger J' carries the rod K so low as to allow the plate $p$ to drop sufficiently to cause the lever $g$ to throw the lever $r'$ against the upper crank $s$ of the vertical shaft $s'$. Said shaft is thereby turned and caused to push the rod N' rearward by the lower crank-arm $s''$. This movement of the said rod sets the crank N in a position to be actuated by the supplemental rock-arm D', as hereinbefore described, and at the same time the pawl $t''''$ is set into a position to engage the ratchet-wheel $t''$, which is thus turned and caused to turn with it the pinion $t'$. This pinion meshes with a similar pinion $u$, attached to the upper end of a vertical shaft $u'$, journaled in bearings, respectively, on the frame-head A''' and base-plate A. On this vertical shaft is a worm-gear $u''$, which is adapted to slide vertically on the shaft and locked thereon to rotate with the shaft, either by a spline on one entering a groove in the other or by an angular form of the shaft and correspondingly-shaped eye in the gear or by other well-known means, the groove being indicated by the heavy black line 13 in Fig. 1 of the drawings. The worm-gear $u''$ meshes with worm-wheels $u'''$ $u'''$, secured to shafts $u''''$, which extend horizontally across the machine and are journaled to the brackets O O, on which the paper-supporting table M is mounted, said brackets being provided with vertical sleeves, by which they slide on the posts A' A'. To the shafts $u''''$ are also fastened the pinions $v$ $v$, which engage vertical racks $v'$ $v'$ on opposite sides of the posts A' A'. It will thus be observed that the paper-supporting table M is raised at intervals of time by the turning of the pinion $t'$, which imparts a corresponding motion to the shaft $u'$, the worm-gear $u''$ of which transmits motion to the shafts $u''''$ $u''''$ by the worm-wheels $u'''$ $u'''$, and the rotation of the latter shafts causes the pinions $v$ $v$ thereof to run upward on the racks $v'$ $v'$, and thereby raise the table M to bring the top of the pile of papers up to the proper plane to allow the paper to pass to the feed-table C', as indicated by dotted line 15 in Fig. 7 of the drawings.

Figure 13:
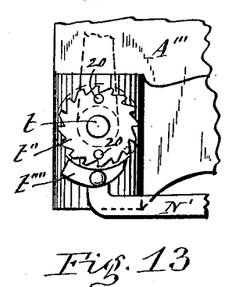
Fig. 13 is a side view of the devices for turning the pinion, which transmits motion to the aforesaid shaft.
Figure 14:
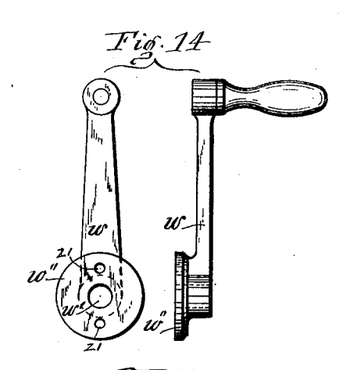
Fig. 14 shows a side view and an edge view of the wrench for turning said pinion.

To allow the table M to be raised or lowered by hand when required, I employ a crank $w$, provided with an eye $w'$, by which to slip it onto the end of the stud-pin $t$ and form it with an annular head $w''$ of a greater diameter than the ratchet-wheel $t''$, so as to cover the outer sides of the teeth of said wheel. The pawl $t''''$ is wider than the wheel, so as to allow the edge of the crank-head $w''$ to bear on the pawl and hold it out of contact with the ratchet-wheel. (See Figs. 13 and 14 of the drawings.) Said crank secures a hold on the ratchet-wheel $t''$ by pins 20, projecting from the latter and entering holes 21 in the crank.

In order to automatically stop the table-raising mechanism when all the paper has been fed from the table and the latter raised to the plane of the feed, I pivot to the crank $s$ a guard-plate 1, which lies across the end of the upper crank $s$ and has its free end sustained by a pin 2, passing through a slot 3 in the plate and secured to the frame. (See Fig. 7 of the drawings.) The slot 3 is of sufficient length to allow the plate to be pushed up by the table M coming in contact with the bottom edge of the plate, and when thus lifted the plate projects above the cam $s$, and thereby prevents the lever $r'$ from striking the pin $s'''$, secured to the free end of the crank $s'$.

P P represent stays against which the sheets of paper abut with their front edges, and are thus held evenly thereat. These stays consist of vertical plates sustained laterally adjustable, so as to accommodate them to different widths of paper to be fed, said plates resting with their lower ends against the rear side of a vertical flange P' on the base-plate A, as shown in Fig. 4 of the drawings. The upper ends of the stays are adjustably sustained on the cross-bar P''', secured to frame-heads A''', which cross-bar is formed with a T-shaped groove P''', as shown in Fig. 7, extending lengthwise of the bar. To each of the stays P P is attached a plate Q, provided with a T-shaped head Q', which is inserted into the groove P'''.

In order to allow the plate Q to accommodate itself to any unevenness in the alignment of the groove P''', I make the attachment of said plate slightly yielding by passing the attaching-bolt loosely through the plate and its head and through a spring Q'' and upset the ends of the bolt. The plate is thus held on the stay P by the pressure of the said spring.

The plate is provided with vertical flanges by which it embraces the side edges of the stay, and thus relieves the bolt from lateral strain in the operation of shifting the stay laterally on the cross-bar P'' to adjust the stay to the width of the paper lying on the table M.

Figure 2:
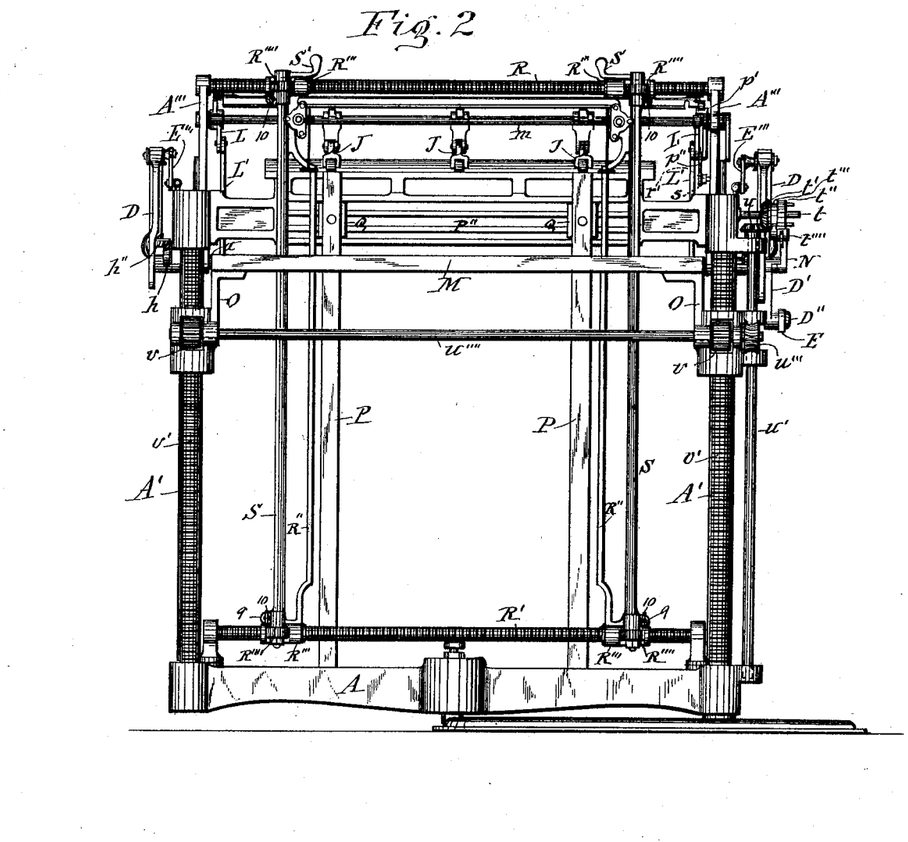
Fig. 2 is a rear end view of the same.

To the top portion of the frame-heads A''' is firmly secured a cross-bar R, the side of which is formed with a rack extending lengthwise thereof, and a similar rack-bar R', parallel with the bar R, is secured to posts attached to the base A, as shown in Fig. 2 of the drawings.

To the two cross-bars R R' are movably connected two vertical bars R'' R'' by means of sleeves R'''' R'''' on the ends of the vertical bars loosely embracing the cross-bars. On the vertical bars are journaled the vertical shafts S S, to which are rigidly attached the pinions R''''' R''''', which engage the racks of the cross-bars. By means of cranks S', attached to the vertical shafts, they can be turned when desired to shift the vertical bars and shafts laterally, which movement is effected by the engagement of the pinion R''''' with the racks of the cross-bars, said adjustment being required to hold the paper evenly piled between the vertical bars R'' R''. Said adjustment also brings over the paper the separating mechanism hereinafter described.

From the upper portion of each of the vertical bars R'' extends rigidly rearward a horizontal arm T, which is concaved on its inner side and has in said side a shaft $x$, extending lengthwise thereof and journaled in bearings on the ends of the arm. To the front end of said shaft is fastened a beveled pinion $x'$, which meshes with a beveled segmental gear $x''$, fastened to the rock-shaft $m$, to which the paper-pushers J are attached. The shaft $x$ thus receives a rocking motion from the shaft $m$.

Figures 15, 16, 17, 18, 19, 20:
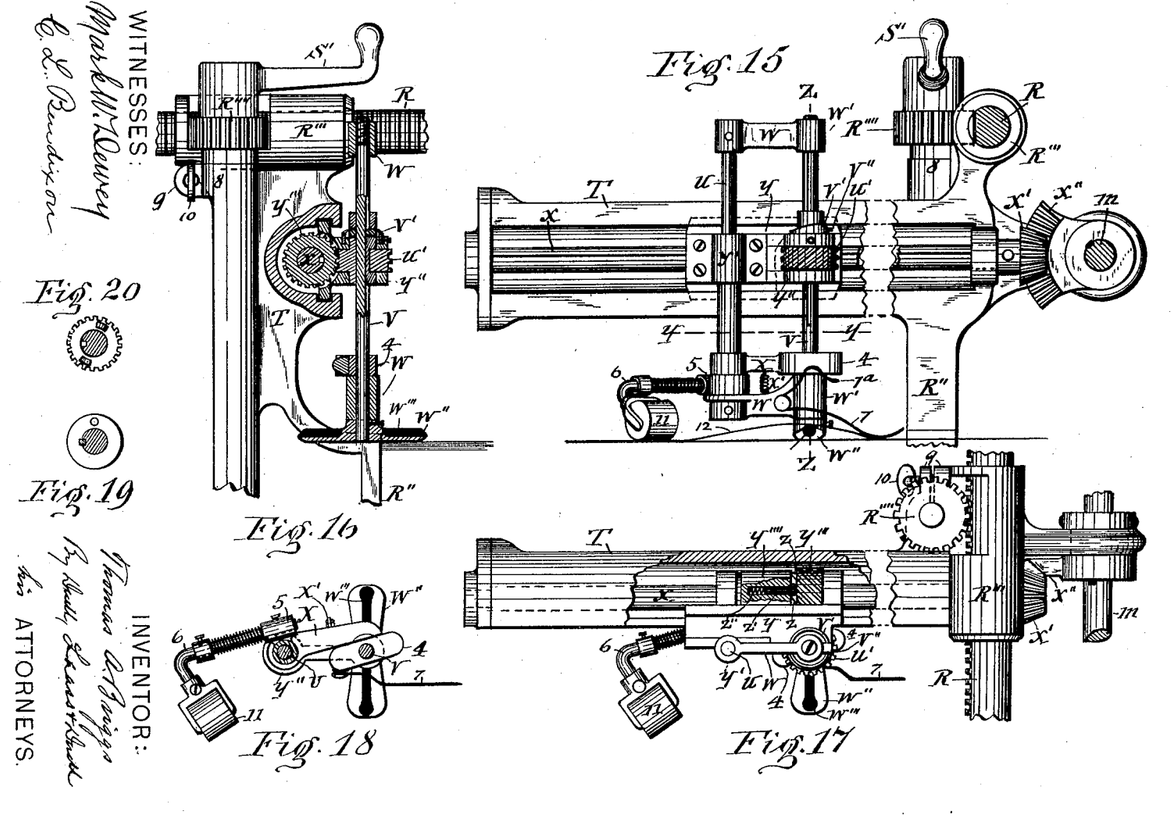
Fig. 15 is a side view of the mechanism for separating the top sheet from the pile of paper preparatory to passing said sheet to the feed-table of the printing-machine.
Figs. 16 and 17 are respectively a transverse sectional view on line $z\ z$, Fig. 15, and a top plan view of said mechanism, each of said views having portions broken away to illustrate the devices in a condensed form.
Fig. 18 is a transverse section on line $y\ y$, Fig. 15.
Figs. 19 and 20 are face views of the clutch devices employed in connection with the said mechanism.

On the shaft $x$ is mounted a longitudinally-movable bracket $y$, which is formed on one side with perforated ears, through which the shaft $x$ passes, and on the opposite side with a vertical guide $y'$ and vertically-perforated ears $y''$. Between the first-named ears of the bracket is a worm-gear $y'''$ and a clutch-collar $y''''$. The said gear is free to rotate on the shaft and the clutch-collar is provided with a spline, which engages a longitudinal groove in the shaft, as shown in Fig. 19 of the drawings, and thus the clutch-collar is forced to turn with the shaft. The side of the worm-gear $y'''$ has rigidly projecting from it two spurs $z$, which are beveled on one side and squared on the opposite side. In the adjacent end of the clutch-collar $y''''$ is a longitudinal channel, in which is a bolt $z'$, backed by a spiral spring $z''$, which forces said bolt outward and in position to engage one of the spurs $z$ during the rocking motion of the clutch-collar, as illustrated in Fig. 17 of the drawings.

In the vertical guide $y'$ on the opposite side of the bracket slides a rod U, and in the ears $y'' y''$ is journaled a worm-gear U', through the center of which passes freely the vertical shaft V, which is provided with a longitudinal groove, in which slides a feather attached to the interior of the gear U'. To the top of the upper ear $y''$ is fastened an upward-projecting cam-ring V', concentric to the shaft, and on said shaft is hung a collar, from which projects a finger V'', which lies across the cam-ring V'. Said collar is made to rotate with the shaft by a lug on the interior of the collar entering the longitudinal groove of the shaft. To the two ends of the rod U are rigidly attached cross-bars W W, formed with vertical sleeves W' W', in which the ends of the shaft V are journaled. Above the lower cross-bar is a duplex cam 4, rigidly secured to the shaft V and extending horizontally in opposite directions therefrom. To the lower end of said shaft, beneath the lower cross-bar W, is fastened transversely at its center a foot W'', to the top of the end portions of which are secured rubber faces W'''' or other suitable frictional bearings. To the rod U above the cross-bar W is swiveled a lever X, which is held in contact with the cam 4 by means of a spring X', attached to the cross-bar and to a downwardly-extending finger on the said lever. On the hub of the lever X is a transverse sleeve 5, in which is held revolubly the paper-buckling finger 6, the free end of which is bent so as to move in the direction of the feed of the paper, and thus maintain the latter in line with the feed. The free end of the finger 6 has rigidly attached to it a rubber block 11, which is made to constantly bear on top of the pile of paper by means of a coil-spring surrounding the finger and fastened thereto at one end and to the sleeve 5 at the opposite end. To the cross-bar W is pivoted a spring-finger 7, which extends forward over the top of the foot W'' and bears with its free end on top of the pile of paper. The opposite end of said finger has a lever 7[a] extending from it and under the duplex cam 4. The described devices are set into a position to operate over the rear corner portion of the pile of paper. The adjustment to said position is effected by shifting the vertical bars R'' R'' on the cross-bars R R' lengthwise of the latter, so as to bring the inner edges of the vertical bars against opposite sides of the pile of paper, and thus keep the same even. Then the brackets $y\,y$ are moved lengthwise on the shafts $x\,x$ to carry the devices connected to the brackets over the rear portion of the pile of paper.

To securely retain the vertical bars R'' R'' in their adjusted position, I split longitudinally the upper journal-boxes 8 8 and provide them with perforated ears 9 9, one of each pair of which is screw-threaded. By means of clamping-screws 10 10, inserted in said ears, the journal-boxes are pinched onto the shafts. This fastening of the vertical shafts is very essential, inasmuch as the paper must be maintained evenly piled on the table M, and this depends on the position of the vertical bars R'' R''.

In the operation of the machine the shafts $x\,x$ turn alternately in opposite directions and make a half-revolution in each turn. In turning in one direction the spring-bolt $z'$ in the clutch-collar $y''''$, which turns with the shaft, engages the spur $z$, and consequently turns the worm-gear $y'''$. In the reverse movement of the shaft $x$ the aforesaid spring-bolt slides over the beveled side of the spur $z$, and thus leaves the worm-gear undisturbed. Hence the said gear is turned intermittently in one direction and the worm-gear U', with the shaft V, is turned correspondingly. In each turn of this latter shaft one of the arms of the duplex cam 4 pushes back the lever X, and thereby turns the finger 6 sufficiently to carry the free end of said finger 6 forward upon the pile of paper. As the shaft V turns, one end of the foot W' is swung off from the top of the paper and simultaneously lifted by the lug V'', riding on the cam-ring V'. The duplex cam 4 is lifted with the shaft V and as the cam turns it presses on the lever 7ª, and thereby causes the finger 7 to bear on the paper with increased pressure. At the same time the finger 6 moves forward and causes the paper to buckle, as represented at 12 in Fig. 15 of the drawings, and while the paper is in this condition the other end of the foot is carried under the buckled portion of the paper, and in this manner the top sheet is separated from the underlying sheet. The rod U and shaft V slide freely vertically on the bracket, and by their gravity they assist to hold the finger 6, with its friction-block, in constant contact with the paper. The movements of the paper-feeding mechanism are so timed that the paper-pushers J J' will push the paper forward as soon as the top sheet has been separated from the subjacent sheet, as before described, the paper being drawn across the rubber face W''' and being pressed thereon by the spring-finger 7 in front and by the rubber block 11 of the finger 6 at the rear. If there should be accidentally two sheets of paper buckled and riding over the rubber face of the foot W', the said rubber face will retain the lower of the said two sheets while the upper sheet is drawn forward. Thus only a single sheet can be fed at a time. During the said operation of the separating mechanism the paper-pushers J J' are raised and swung rearward, and by the time the top sheet has been separated from the subjacent sheet the aforesaid pushers are brought to bear on the paper and moved forward, and thereby push the top sheet to the feed-table C', where the sheet is taken by the grippers G G.

Matters not herein claimed are subjects-matter of other applications for patent, Serial No. 412,991, filed November 24, 1891, and Serial Nos. 423,814 and 423,815, filed March 5, 1892.

Having described my invention, what I claim as new, and desire to secure by Letters Patent, is—

1. In combination with the feed-table of a printing-machine, longitudinal guides on opposite sides of the machine, slides mounted on said guides, a transverse shaft connected to said slides, grippers on said shaft, rock-arms on opposite sides of the machine, stationary segmental gears fixed to the frame concentric to the axis of the rock-arms, shafts journaled on the rock-arms lengthwise thereof, pinions on both ends of said shafts and receiving motion from the stationary gear, shafts journaled transversely to the free ends of the rock-arms, pinions on said transverse shafts meshing with the outer pinions on the rock-arms, pitmen attached to the aforesaid slides, and arms fixed to the transverse shafts on the rock-arms and connected to the pitmen, substantially as described and shown.

2. In combination with the feed-table of a printing-machine, longitudinally-reciprocating slides on opposite sides of said table, a transverse shaft journaled on said slides, a stationary bar at the side of and parallel with the shaft, gripper-hooks mounted on the shaft and sustained in their position by the stationary bar, gripper-tongues fixed to the shaft, and a crank fixed to the end of the shaft for turning the same and opening the grippers, as set forth.

3. In combination with the feed-table of a printing-machine, longitudinally-reciprocating slides on opposite sides of said table, a transverse shaft journaled on said slides, a stationary bar by the side of and parallel with the said shaft, gripper-hooks hung loosely on the shaft and sustained in this position by the stationary bar, gripper-tongues fixed to the shaft, a crank on one end of the shaft, a finger pivoted to the slide and connected with the crank, and a stationary stop actuating said finger to open the grippers, as set forth.

4. In combination with the shaft $j$, the stationary bar H, the gripper-hook G, formed with perforated ears G' G' and mounted thereby on said shaft and having shoulders G'' G'', abutting against the stationary bar, and the tongue H, formed with the eye H' and clamped on the aforesaid shaft between the ears G' G', substantially as described and shown.

5. In combination with the feed-table of a printing-machine, longitudinal slides on opposite sides of the machine, a gripper-shaft journaled on said slides, a crank on one end of said shaft, a finger pivoted to one of the slides and connected with the crank, and a tripper hung on the frame back of the feed-table in the path of the finger and movable forward and restrained from rearward movement, substantially as described and shown.

6. In a paper-feeding machine, the combination of a transverse shaft provided with a longitudinal groove and the paper-pusher formed with a hook and hung thereby on said shaft and provided with a longitudinal channel in its pendent portion, a spiral spring in the bottom of said channel, and a bolt seated on said spring and forced thereby into engagement with the groove of the shaft, substantially as described and shown.

7. In combination with the rock-shaft $m$, provided with a longitudinal groove, the paper-pushing arm J, formed with a hook $J'''$ and provided with a channel $n$, recess 14, and a slot in its side, a sliding bolt $n'$, and a spring $n'''$ in said channel, and a set-screw $n''$, passing through the bolt, substantially as described and shown.

8. In combination with the paper-supporting table and rock-shaft, a transverse shaft over said table, a lever fixed to the rock-shaft, a bell-crank fixed to the transverse shaft and connected at its lower end to the aforesaid lever, arms secured to the transverse shaft, fingers hinged to said arms and inclined forward therefrom, rods attached to the fingers and extending upward therefrom, disks on said rods, a plate pivoted to the upper end of the bell-crank and having its front edge under the disks, a cam pivoted to the frame, an arm attached to the end of said plate, a roller pivoted to the front end of said arm and traveling on said cam, a lug on the end of said arm, and an inclined cam on the frame for engaging the lug and thereby lifting the arm and carrying the roller to the top of the cam, as set forth.

9. The combination of the frame-posts formed with vertical racks, brackets sliding vertically on said posts, the paper-supporting table mounted on the brackets, horizontal shafts extending across the machine and journaled on the brackets, pinions on said shafts, engaging the racks, worm-gears on the shafts, a vertical shaft journaled to the frame, a worm-gear movable vertically on the latter shaft and locked from rotation thereon, a miter-pinion fixed to the end of the vertical shaft, an actuating miter-pinion pivoted to the frame, and a crank turning the latter pinion, as set forth.

10. In combination with the vertically-movable table, vertical racks, pinions engaging the racks and carrying the table, a vertical shaft, gears transmitting motion from said shaft to the pinion, a miter-pinion fastened to the vertical shaft, a similar pinion meshing therewith, a ratchet-wheel fixed to the latter pinion, a pawl engaging said ratchet-wheel, and a rock-arm actuating the pawl, as set forth.

11. In combination with the vertically-movable table, vertical racks, pinions engaging said racks and carrying the table, a vertical shaft, gears transmitting motion from said shaft to the pinions, a miter-pinion fixed to the vertical shaft, a stud-pin projecting horizontally from the frame, a miter-pinion mounted loosely on said stud-pin and engaging the miter-pinion of the vertical shaft, a ratchet-wheel fixed to the miter-pinion on the stud-pin, a hanger mounted loosely on the hub of said pinion, a pawl pivoted to said hanger and engaging the ratchet-wheel, a rod connected to the hanger, and a rock-arm connected to said rod, as set forth and shown.

12. In combination with the loosely-mounted pinion, a ratchet-wheel fixed to said pinion, a hanger mounted loosely on the hub of the pinion, a pawl pivoted to the hanger and projecting over the side of the ratchet-wheel, a rod connected to the hanger, a rock-arm connected to said rod, pins projecting from the side of the ratchet-wheel, and a hand-crank provided with a head of greater diameter than the ratchet-wheel and provided in said head with holes for the reception of the aforesaid pins, substantially as and for the purpose described.

13. In combination with the loosely-mounted pinion and ratchet-wheel fixed thereto, a hanger loosely mounted on the hub of said pinion, a pawl pivoted to said hanger, a rock-arm, a crank hung loosely on the shaft of said rock-arm, projections on the adjacent sides of the rock-arm and crank and transmitting intermittent motion to the crank, and a rod connecting the crank with the aforesaid hanger, and a lever actuated by the paper-feeding mechanism and returning the pawl to its normal position for re-engaging the ratchet-wheel, as set forth.

14. In combination with the paper-feeding fingers, the vertically-movable table and mechanism for raising and lowering said table, a vertical shaft transmitting motion to said mechanism, a miter-pinion fixed to said shaft, a stud-pin projecting horizontally from the frame, a miter-pinion mounted loosely on said stud-pin, a ratchet-wheel fixed to the latter pinion, a hanger loosely mounted on the hub of said pinion, a pawl pivoted to said hanger, a rock-arm, a crank hung loosely on the shaft of the rock-arm, projections on the adjacent sides of the rock-arm and crank with a partial play between said projections, a rod connecting the crank with the aforesaid hanger, and thereby cause the pawl to actuate the aforesaid ratchet-wheel, a crank-shaft engaging the said rod to return to its position of rest, a lever adapted to actuate said crank-shaft, an oscillatory lever connected with said lever and lifted by the paper-feeding fingers, and a cam traversed by said oscillating lever, and thereby raising said oscillatory lever, as set forth.

15. In combination with the table-raising mechanism, a loosely-mounted pinion for actuating said mechanism, a ratchet-wheel fixed to said pinion, a pawl connected to an oscillatory support, a rock-arm transmitting motion to said support, a crank-shaft engaging said support, oscillatory paper-feeding fingers, an oscillatory plate lifting said fingers, a cam pivoted to the frame, an oscillatory lever traveling on said cam and actuating the lifting-plate, an oscillatory lever controlled by the oscillating feed-fingers, and a lever connected with said oscillatory lever and adapted to actuate the aforesaid crank-shaft, as set forth.

16. In combination with the rock-shaft $a$, the lever M', shaft $m$, bell-cranks L L, pitman L', the plate $o$ and arm $o'$, both attached to one and the same shaft pivoted to the upper end of the bell-cranks, the roller $o''$ on the free end of said arm, the pivoted cam $p'$, provided with the weighted arm $p''$, the lug $o'''$ and cam $o''''$, attached, respectively, to the arm $o'$ and frame, the plate $p$ and lever $g$, pivoted to rock simultaneously, the lever $r'$, pivoted to the bell-crank and connected to the lever $g$, the arms J, attached to the shaft $m$, the paper-pushing fingers J', hinged to said arms, rods K, attached to said fingers and having their free ends under the plate $p$, disks K', connected to the rods and lifted by the plate $o$, the crank-shaft $s'$, having the arm $s$ in the path of the lever $r'$, the loosely-mounted pinion $t'$, ratchet-wheel $t''$, fixed to said pinion, hanger $t'''$, mounted loosely on the hub of the pinion, the pawl $t''''$, connected to said hanger, the rock-arm D', crank N, actuated by said rock-arm in one direction, and the rod N', connecting said crank with the aforesaid hanger and moving the same in said direction and engaged with the crank $s''$ of the aforesaid crank-shaft and moved thereby in the opposite direction, substantially as described and shown.

17. In combination with the frame and paper-supporting table, the vertical flange P' on the base of the frame, the stays P, resting against said flange, the cross-bar P'', attached to the frame-heads and formed with a longitudinal T-shaped groove, and the plates Q, secured to the stays and provided with T-heads inserted in the groove of the cross-bar, as set forth.

18. In combination with the stay P and the cross-bar P'', provided with a longitudinal T-shaped groove, the plate Q, formed with a T-head, the attaching-bolt passing through said plate and head, and the spring Q'', interposed between the head of the bolt and head of the plate, substantially as described and shown.

19. The combination, with the frame and paper-supporting table, of cross-bars secured to the top and bottom of the frame and paper-sustaining bars supported in vertical positions on said cross-bars and adjustably lengthwise of the latter to allow said vertical bars to be set closely against opposite sides of the pile of paper on the supporting-table, as set forth.

20. The combination, with the frame and paper-supporting table, of horizontal rack-bars extending across the frame, sleeves mounted loosely on said bars, paper-sustaining bars secured to said sleeves, vertical shafts journaled on said bars, and pinions on said shafts engaging the rack-bars, as set forth.

21. In combination with the horizontal rack-bars extending across the machines, sleeves mounted loosely on said bars, vertical journal-boxes on the sleeves split longitudinally, clamping-screws connected to said journal-boxes, vertical shafts in said boxes, pinions on said shafts engaging the rack-bars, and paper-sustaining bars attached vertically to said sleeves, as set forth and shown.

22. In combination with the frame and paper-supporting table, laterally-adjustable paper-sustaining bars for engaging the side edges of the paper piled on the table, and paper-separating mechanism carried by said bars to a corresponding position in relation to the pile of paper, as set forth.

23. In combination with the frame and paper-supporting table, cross-bars secured to the frame, vertical bars connected to the cross-bars adjustably lengthwise of the latter, arms extending from the vertical bars, and paper-separating mechanism connected to said arms, as set forth.

24. In combination with the frame and paper-supporting table, cross-bars attached to said frame, sleeves mounted movable laterally on said bars, clamping-screws confining the sleeves on said bars, paper-sustaining bars attached vertically to the said sleeves, arms extending rigidly rearward from said vertical bars, and paper-separating mechanism connected to said arms, all combined to simultaneously adjust said paper-sustaining bars and paper-separating mechanism laterally in their positions in relation to the width of the pile of paper, substantially as set forth.

25. In combination with the frame and paper-supporting table, rack-bars extending across the frame, sleeves mounted loosely on said bars, vertical paper-sustaining bars attached to said sleeves, vertical journal-boxes on said bars split longitudinally, clamping-screws on said boxes, vertical shafts passing through the boxes, pinions on said shafts engaging the rack-bars, cranks on the shafts, arms extending from the vertical bars, and paper-separating mechanism connected to said arms, as set forth.

26. In combination with the frame and paper-supporting table, brackets supported adjustably in their positions in relation to the width of the paper piled on the table, and paper-separating mechanism sliding vertically on said brackets and comprising a finger bearing upon the paper, a finger buckling the paper, and a rotary foot separating the paper, substantially as set forth.

27. In combination with the frame and paper-supporting table, cross-bars attached to said frame, vertical paper-sustaining bars connected to the cross-bars, adjustable lengthwise of the latter, arms extending from said vertical bars, brackets carried on said arms, adjustable lengthwise thereof, and paper-separating mechanism connected to said brackets, as set forth.

28. In combination with the frame and paper-supporting table, laterally-adjustable vertical bars, arms extending horizontally rearward from said bars, oscillatory shafts extending lengthwise of said arms, brackets hung on said shafts, and paper-separating mechanisms connected movable vertically to said brackets and actuated by the aforesaid shaft, as specified.

29. In combination with the frame and paper-supporting table, a rock-shaft, a gear on said shaft, a horizontal shaft parallel with the line of feed, a gear on the latter shaft meshing with that of the rock-shaft, a bracket hung on said horizontal shaft, and paper-separating mechanism connected to said bracket and actuated by the said horizontal shaft, and a paper-buckling finger moving in the direction of the feed of the paper, as set forth.

30. In combination with the frame and paper-supporting table, laterally-adjustable paper-sustaining bars, arms extending horizontally from said bars, a rock-shaft pivoted to the frame, gears on said shaft, shafts extending lengthwise of said arms, gears on the latter shaft meshing with those of the rock-shaft, brackets hung on the shafts of the arms, and paper-separating mechanisms connected movable vertically to said brackets and actuated by the latter shafts, as set forth.

31. In combination with the frame and paper-supporting table, a rock-shaft extending across the frame, paper-feeding devices connected to said rock-shaft, a horizontal shaft at right angles to the rock-shaft, gears transmitting motion from the said rock-shaft to the said horizontal shaft, a bracket hung on the latter shaft, and paper-separating mechanisms connected to the brackets and actuated by the aforesaid horizontal shaft and movable in the direction of the feed of the paper, as set forth.

32. In combination with the frame and paper-supporting table, laterally-adjustable paper-sustaining bars, arms extending rearward from said bars, shafts extending lengthwise of said arms and pivoted thereto, brackets hung on said shafts, a rock-shaft and gears actuating the aforesaid shafts, paper-feeding devices connected to said rock-shaft, and paper-separating mechanisms connected movable vertically to the brackets and actuated by the shafts of the aforesaid arms, substantially as set forth.

33. In a paper-separating mechanism, the combination of a paper-buckling finger, an arm bearing on the top of the paper in front of said finger, a revoluble foot entering between the buckled top sheet of the said paper between said finger and arm, and frictional rubber bearings secured to the top of said foot, as set forth.

34. In a paper-separating mechanism, the combination, with a paper-buckling finger held in contact with the top of the paper, a friction-block on the bearing end of said finger, a spring-finger bearing on the paper in front of the paper-buckling finger, a vertical revoluble shaft provided with a foot entering beneath the paper buckled between the aforesaid fingers, a lever connected to the paper-buckling finger, and a cam attached to the aforesaid shaft and engaging the said lever and thereby actuating the paper-buckling finger, as set forth.

35. In combination with the paper-supporting table, a horizontal rock-shaft parallel with the line of feed, a bracket connected to said shaft, a vertical shaft sustained movable vertically in the bracket, gears transmitting motion from the horizontal shaft to the vertical shaft, a foot extending from the vertical shaft, a cam affixed to the latter shaft, an oscillatory paper-buckling finger held in contact with the paper back of said foot, a lever extending from the buckling-finger and actuated by the aforesaid cam, and a finger bearing on the paper in front of the aforesaid foot, substantially as set forth and shown.

36. In combination with the paper-supporting table, the rock-shaft $x$, the bracket $y$, provided with ears receiving through them the rock-shaft and provided at the opposite side with vertically-perforated ears $y'' y''$ and vertical guide $y'$, the gear $y'''$, mounted loosely on the shaft between the ears of the bracket, the clutch-collar $y''''$, connected to the shaft, movable longitudinally, and locked to rotate with the shaft, spurs $z$, projecting from the side of said gear and beveled on one side, the spring-bolt $z'$ in the adjacent end of the clutch-collar, the rod U, sliding in the vertical guide $y'$, the gear U', journaled in the ears $y''$, the shaft V, passing freely vertically through said gear and locked to rotate with the same, a collar connected in a like manner to said shaft and provided with the finger V'', the cam-ring V', attached to the top of the upper ear $y''$, the cross-bars W W, fixed to the ends of the rods U and provided with journal-bearings for the vertical shaft V, the duplex cam 4 and foot W'', fastened to the said shaft, rubber faces W''', secured to the top of the foot, the lever X, swiveled on the rod, the spring X', holding the said lever in contact with the cam, the sleeve 5, extending from the hub of said lever, the arm 6, secured revolubly in said sleeve, a spring pressing said arm upon the paper, a rubber block fixed to the free end of said arm, the spring-finger 7, pivoted to the cross-bar W, and the lever 7ª, extending from said lever and under the cam 4, all combined to operate substantially as described and shown.

In testimony whereof I have hereunto signed my name this 16th day of November, 1891.

THOMAS A. BRIGGS. [L. S.]

Witnesses:
 WILLIAM H. H. TUTTLE,
 ARTHUR W. SIM.